Oct. 23, 1962 W. BUCHHOLZ ET AL 3,060,418
CORE ARRAY TEMPERATURE RESPONSIVE APPARATUS
Filed Oct. 9, 1959 4 Sheets-Sheet 1

INVENTORS
WERNER BUCHHOLZ
ERNEST C. SCHUENZEL
BY
ATTORNEY

Oct. 23, 1962 W. BUCHHOLZ ET AL 3,060,418
CORE ARRAY TEMPERATURE RESPONSIVE APPARATUS
Filed Oct. 9, 1959 4 Sheets-Sheet 2
FIG. 4a
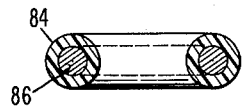
FIG. 4b
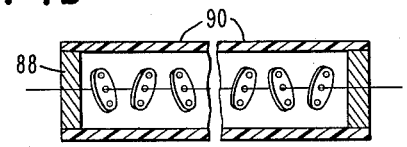
FIG. 4c
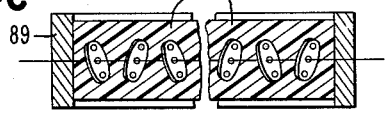
FIG. 5a
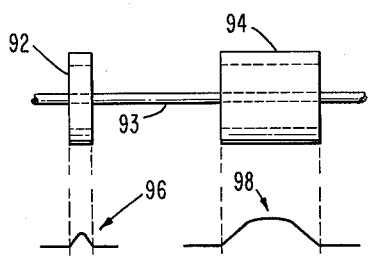
FIG. 5b
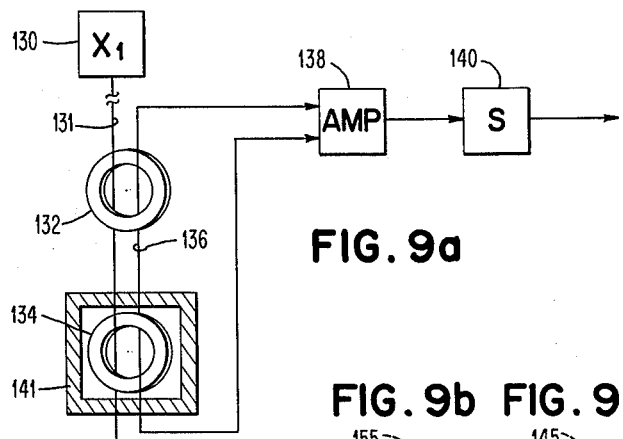
FIG. 9a
FIG. 9b  FIG. 9c  FIG. 9d
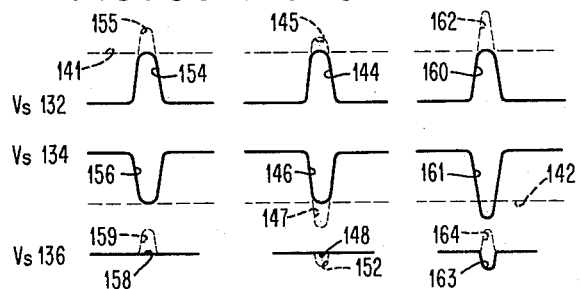

Oct. 23, 1962   W. BUCHHOLZ ET AL   3,060,418
CORE ARRAY TEMPERATURE RESPONSIVE APPARATUS
Filed Oct. 9, 1959   4 Sheets-Sheet 3

United States Patent Office 3,060,418
Patented Oct. 23, 1962

3,060,418
CORE ARRAY TEMPERATURE RESPONSIVE
APPARATUS
Werner Buchholz, Wappingers Falls, and Ernest C. Schuenzel, Poughkeepsie, N.Y., assignors to International Business Machines Corporation, New York, N.Y., a corporation of New York
Filed Oct. 9, 1959, Ser. No. 845,499
8 Claims. (Cl. 340—227)

This invention relates to core array temperature responsive apparatus and more particularly to apparatus for signaling the approach of overheating of cores of a group of cores as a result of excessive rate of repetitive operation thereof.

While throughout this disclosure, reference is made to magnetic ferrite core elements, it will be evident that the inventive concept involved is applicable to various types of elements of which magnetic ferrite core elements are among the most common. Thus, the word "core" as employed in the claims should be broadly construed.

In electrical computer apparatus and other data processing apparatus, magnetic cores are employed for the storage of information and similar cores are also employed as transformer cores in code translators and switching applications. Present day apparatus of this type are capable of operating at extremely high rates of speed but repeated operation of the cores is accompanied by heating thereof.

Excessive core heating in such apparatus results in a degradation of the hysteresis characteristics of the core causing a loss of the information contained in or transmitted by the core. While cooling forced air flow and cooling fluid baths are provided as heat dissipating means in many instances, the rate of successive operation of the core array is limited by the maximum permissible operation repetition rate of any one of the elements of the core array even though this repetition of operation of the same element may be expected to occur relatively infrequently. Thus, if means are provided to signal the approach of said infrequent overheating resulting from successive operation of the same core, the rate of repetitive operation of the core array can be substantially increased.

It is accordingly the primary object of this invention to provide relatively simple means compatible with core arrays for providing signaling of the approach of overheating of cores of groups of cores in the arrays resulting from excessive rate of repetitive operation thereof.

There are numerous types of well-known core arrays serving as memory arrays, switching arrays, translating arrays, etc. The invention may be variously embodied in apparatus associated with these and other different types of arrays whereby a test core is pulsed each time cores of a group of cores are pulsed to provide a test output which may be employed to indicate overheating of the associated group of cores.

It is, accordingly, a more specific object of the invention to provide a test core in association with a group of cores and to provide drive means for switching the test core each time cores of the group are switched and to provide test core output responsive means which are sensitive to a change in the test core output resulting from overheating of the test core due to excessive rate of repetitive driving thereof.

In the normal operation of a two or three dimensional core array, a sense line extends through a plurality of cores and, during successive read-write operations, a random pattern of half-select output pulses are applied to the sense lines. Thus, while a full-select pulse on the sense line is detectable, minor variations in amplitude of this full-select pulse are obscured by the random half-select pulses.

Accordingly, it is a further object of the invention to provide in combination with a plurality of groups of cores, a plurality of test cores, one associated with each of said groups, in which a single sense line passes through all of the test cores and, during normal operation of the array and the test cores, the test sense output consistently includes a uniform condition of half-select pulses in combination with the full-select output pulse of one of the test cores whereby relatively minor variations in amplitude of the full-select output pulse can be determined, not being obscured by a random pattern of half-select pulses.

A further object of the invention involves the utilization of test cores which are more sensitive to changes in the operating characteristics (which result from changes in temperature) caused by the driving current employed in driving the core in groups being tested by the test core.

It is a further object of the invention to drive the test cores with greater driving forces than employed with cores of their associated groups in order to heat the test cores more rapidly than the cores of their associated groups.

A still further object of the invention is to accomplish the foregoing objects in various combinations with the various arrays of cores previously noted, these various combinations all representing various embodiments of the invention disclosed.

The foregoing and other objects, features and advantages of the invention will be apparent from the following more particular description of preferred embodiments of the invention as illustrated in the accompanying drawings;

In the drawings:

FIGURE 4a is a transverse section through a toroidal core coated with a heat insulating material.

FIGURE 4b is a transverse section through a core plane encased between sheets of heat insulating material.

FIGURE 4c is a transverse section through a core plane encapsulated in a heat insulating material.

FIGURE 5a is a showing of two toroidal cores of dissimilar cylindrical lengths each positioned on a conductor.

FIGURE 5b shows the respective temperature gradient curves for the two cores shown in FIGURE 5a.

FIGURE 6c is a wiring diagram of an alternative arrangement of a test plane of the core array of FIGURE 6a.

FIGURE 9a is a fragmentary wiring diagram showing an alternative test core arrangement.

FIGURES 9b, 9c, and 9d show voltage output pulses of test cores of FIGURE 9a under various operating conditions.

Figure 1A:
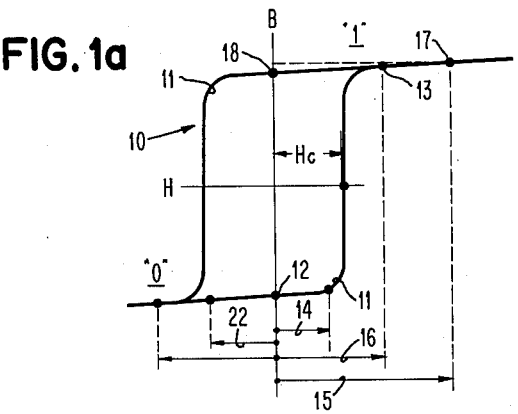
FIGURE 1a is a typical hysteresis loop for a "square loop" core having "sharp knees" suitable for coincident current core operation.

In FIGURE 1a, there is indicated generally at 10, a conventional B-H hysteresis diagram for a square loop ferrite having a coercivity $H_c$ and having sharp knees 11 suitable for coincident current operation. If the core is in the "0" state and has a magnetization value indicated by the point 12, a half-select drive pulse having a value and polarity indicated by the line 14 will not switch the core to the opposite or "1" magnetic state. On the other hand, a full select driving force having a value and polarity indicated by the line 16 will be sufficient to switch the core to saturation as indicated by the point 13 and upon the removal of the force, the core will come to rest in the "1" state with a magnetization value indicated by the point 18.

Figure 1B:
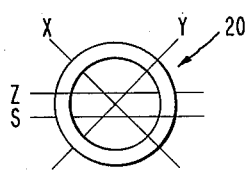
FIGURE 1b shows a conventional toroidal core and its associated windings for coincident current operation.

This type of coincident current operation is well known in the art in conjunction with arrays of cores in which each core is threaded by conductors as indicated generally at 20 in FIGURE 1b in which the X and Y conductors each carry a half-select current providing driving forces as indicated at 14, the Z conductor carries an inhibit current providing a driving force as indicated at 22, and the sense line carries an output pulse whenever the core is switched. Cores of this nature are employed in arrays such as those shown in FIGURES 6, 7, and 8 which will be hereinafter described. A typical utilization of this type of core array is disclosed in the Greenhalgh Patent Number 2,872,666.

Figure 2A:
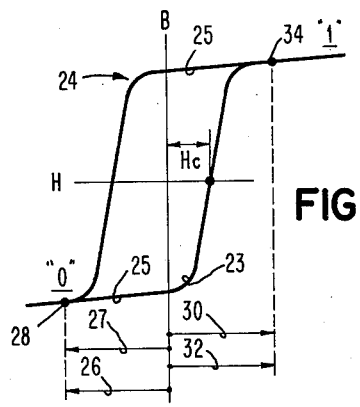
FIGURE 2a is a typical hysteresis loop for a "non-square" core having "flat-tops" suitable for biased core operation.

In FIGURE 2a, there is indicated generally at 24, a hysteresis loop having substantially flat top and flat bottom lines 25 but being non-square in the sense that it represents a ferrite unsuitable for coincident current operation. The advantage is, however, that this type of material has a low coercivity as indicated at $H_c$. The core represented by this curve is normally operated with a bias force indicated at 26 which normally holds the core in a "0" state with a saturated magnetic condition as indicated at 28. The core is switched by the application of coincident driving forces as indicated at 30 and 32, one of which is sufficient to overcome the bias force 26.

Figure 2B:
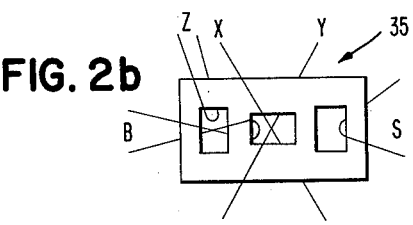
FIGURE 2b shows a conventional multi-path core and its associated windings for biased operations.

In FIGURE 2b, there is indicated generally at 35 a multipath core with conventional arrangements of X and Y drive lines for providing the driving forces indicated at 30 and 32 in FIGURE 2a, a B or bias line carrying the bias force 26, a Z or inhibit line carrying an inhibit force 27 and a sense line S on which the core output is sensed when the core is switched. This type of operation is well-known in the art and cores of this type with this type of operation may be employed in any of the core arrays shown in FIGURES 6, 7, and 8 which will be hereinafter described.

In operation of core arrays employing cores operating as described in connection with either FIGURES 1a and 1b or FIGURES 2a and 2b, the cores, when switched, are driven to saturation, therefore the successive core output pulses appear on the sense lines as substantially constant amplitude pulses, assuming substantially uniform drive current pulses, except for the effects of core temperature and half-select noise pulses.

Figure 3B:
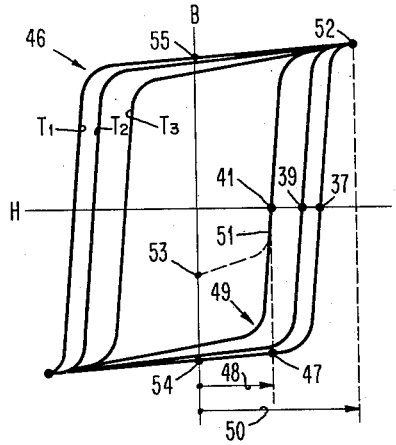
FIGURE 3b shows ferrite hysteresis characteristic degradation at successively increasing temperatures.
Figure 3A:
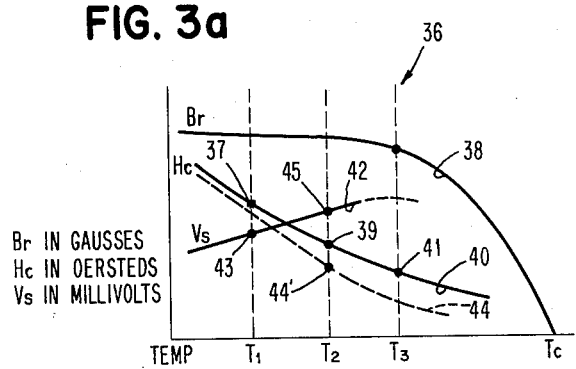
FIGURE 3a is a plot of typical characteristics versus temperature for ferrite cores.

In FIGURE 3a, there is shown generally at 36, curves of typical characteristics of magnetic ferrite cores versus temperature. Curve 38 is a curve representing residual flux density, $B_r$ in gausses versus temperature. Cover 40 is a curve representing coercivity $H_c$ in oersteds versus a temperature. Curve 42 is a curve representing voltage output upon switching $V_s$ in millivolts versus temperature. Along the temperature axis are indicated temperature T1, T2, T3, and TC. T1 and T2 represent the span of normal operating temperatures. T3 represents a value of over temperature and TC indicates the Curie temperature for the material.

FIGURE 3b is a family of hysteresis characteristic curves showing the degradation of the hysteresis characteristic of a magnetic ferrite core with increasing temperature. The successive curves labeled T1, T2, and T3 are representations of the hysteresis characteristic of a ferrite core at temperatures T1, T2, and T3 indicated in FIGURE 3a.

Core driving forces are indicated by the arrows 48 and 50. Arrow 48 indictaes a half-select driving force and arrow 50 represents a full-select driving force, i.e., two-half-select driving forces. The driving force 50 switches the core to a magnetic state indicated at 52 and the half-select pulse 48 switches the core at temperatures between T1 and T2 to a magnetic state indicated at 47.

It will be evident that if the core at temperature T1 is at rest with a magnetic state as is indicated at 54, the full-select pulse 50 will switch it to the magnetic state indicated by the point 52 and when the driving force is removed, the core will retain a magnetic state as indicated at point 55. If, on the other hand, with the core at a magnetic state at 54, a half-select pulse is applied thereto, the core will be driven to a magnetic state indicated at 47 and upon the release of this driving force, the core will return to approximately the magnetic state indicated at 54.

Upon heating of the core, however, the coercivity of the core decreases as indicated at FIGURE 3a, and at temperature T2, the coercivity of the core will be that indicated at points 39 in FIGURES 3a and 3b. With the hysteresis characteristic as is indicated by the curve T2 of FIGURE 3b, the full select pulse 50 will switch the core from the magnetic state indicated at 54 to a saturated state indicated at 52 and the half select pulse 48 will still drive the core to the state indicated at 47 from which it will return substantially to the state indicated at 54 when the half select driving pulse is removed.

However, when the core has been heated to the temperature T3 indicated in FIGURE 3a, the coercivity of the core will have dropped to the value indicated at 41 in FIGURE 3a and the hysteresis loop will have degraded to the form of the loop T3 in FIGURE 3b. Under these conditions, the full select driving force 50 will still drive the core to a saturated condition in the vicinity of point 52 of FIGURE 3b but the half select pulse 48 will drive the core past the knee of the curve as indicated at 49 to a magnetic state indicated at 51 and substantially completely erase any information carried by the core by virtue of the fact that the core, when the driving force 50 is removed therefrom, will return to a magnetic state as indicated by the point 53. Thus, half select operation of a core when it has increased in temperature beyond its normal operating range has served to destroy the information contained therein.

In view of the fact that the coercivity of a core reduces upon increasing temperature before any substantial reduction occurs in the maximum flux density of the core, the voltage pulse produced by the core upon switching by the $V_s$ curve increases as indicated between points 43 and 45 on temperature lines T1 and T2 in FIGURE 3a. Thus, increase in voltage of $V_s$ can be employed as means for signalling heating of a core and the voltage level at temperature T2 indicated at point 45 in FIGURE 3a can be used as a signal level above which undesirable heating of the core has occurred.

While the foregoing discussion of FIGURES 3a and 3b has been in conjunction with coincident current operations, it will be evident that degradation of a hysteresis loop of the type shown in FIGURE 2a will also occur upon heating. Excessive reduction of the $H_c$ of such a loop will cause the knees 23 and 24 of the loop to cross the B axis, giving rise not only to switching of the core to a substantial degree when the bias drive is balanced by a half select drive, but also giving rise to a substantial drop in the residual flux $B_r$. The approach of these conditions in the biased operation type of core is indicated by a reduction in $H_c$ before any substantial reduction of $B_r$ occurs and, thus, a corresponding increase in the sense voltage output occurs upon heating of the coincident current type of core described in connection with FIGURES 3a and 3b.

These characteristics are employed in the invention, various embodiments of which will be hereinafter described in conjunction with the various drawings and with further reference to FIGURES 3a and 3b.

Figure 6A:
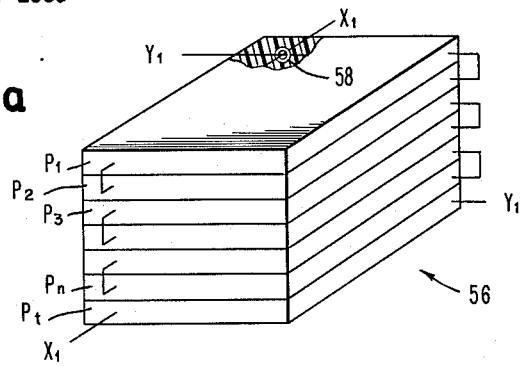
FIGURE 6a is a conventionalized showing of multi-plane core memory array.

A first embodiment of the invention will now be described in conjunction with FIGURES 6a and 6b. In FIGURE 6a, there is indicated generally at 56, a three dimensional core memory array of core planes P1, P2, P3, and Pn of any desired number and including a test plane $P_t$. Each plane is made up of a plurality of cores 58 in two dimensional array as is more fully shown in FIGURE 6b by cores 62. A plurality of X and Y address drive lines define columns and rows in each plane and, at their respective intersections, they pass through cores as shown at 58 in FIGURE 6a and at 62 in FIGURE 6b. The X and Y drivers conventionally pass through the successive core planes in repetitive patterns.

Figure 6B:
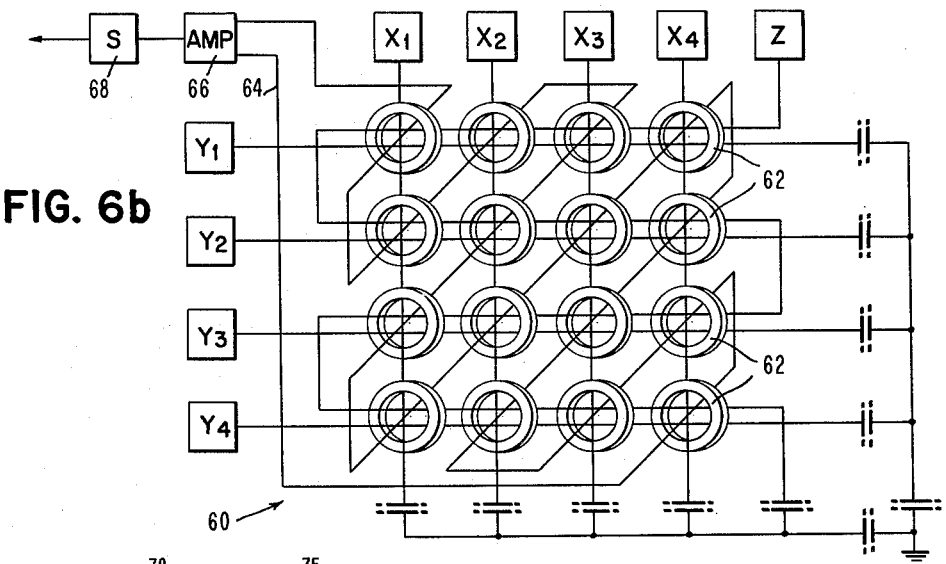
FIGURE 6b is a wiring diagram of one plane of the core array shown in 6a employed as a test plane.

While only one core is shown at 58 in FIGURE 6a, it will be evident that in each of the planes in FIGURE 6a there are a plurality of cores each having conductors passed therethrough as shown in FIGURE 1b and FIGURE 6b, and to simplify the drawings FIGURE 6b, and FIGURE 6c which will be hereinafter described, both show core planes involving only 16 cores, however, it will be evident that in actual practice, many more cores will be usually employed in a core plane. Each "word" written into the memory is retained by a stack of cores in the same X, Y address locations in each of the core planes and includes a plurality of bits comprising "1's" or "0's," one bit being delivered to each of the core planes. Thus, for example, if it is desired to set up a "1" bit of information in a core plane at a particular X, Y address, the Z or inhibit line in that plane will not be pulsed if coincident current operation is involved, on the other hand, if it is desired to enter a "0" bit of information, the Z line will be pulsed. This type of operation is well-known in the art, similarly bias operation, as described in connection with FIGURES 2a and 2b, may be employed in various well-known manners.

The sense line 64 in FIGURE 6b threads all of the cores 62 of the plane, carries an output signal upon the switching of any of the cores and connects to an amplifier 66.

As previously noted in connection with FIGURE 6a, a conventional three dimensional memory array involves the use of a plurality of planes of cores which are selectively switched depending upon the information to be stored therein. If to this conventional array, there is added a test plane $P_t$ with a test core 62 associated with each core stack, then a test core 62 will be set each time a word is read into an address location in the memory array. For this purpose, the Z or inhibit line is not pulsed for the test plane. In view of the fact that information stored in conventional memory operations is successively read out and then rewritten, all of the cores in the test plane will normally be in a "1" state, and upon an operation, only the test core of the selected address to be read will be switched through a read-write cycle.

Thus, unlike the operation of the other core planes in the memory array in which the various cores in the plane will have a random pattern of "1" and "0" settings providing a random pattern of half-select output pulses upon each read-out operation, there does not exist any random half-select output pulses in the test plane output, and every sensing operation of the test plane will be accompanied by a substantially uniform and constant degree of background half-select noise in the sense output line, assuming that the drive currents are substantially uniform. Due to this uniformity of output, a voltage sensitive signalling means 68 may be employed to receive the output from sense amplifiers 66 and to produce an output signal only when the sense pulse voltage has exceeded a predetermined amplitude. A voltage level may be selected depending upon the temperature and flux characteristics of the particular cores involved in order to indicate whenever any of the word stacks in the array are approaching an undesirable degree of overheating as previously discussed in connection with FIGURES 3a and 3b.

Thus, for example, if the cores of the array have output voltage $V_s$ versus temperature curves similar to the curve 40 in FIGURE 3a, the voltage sensitive output signalling means 68 may be responsive to voltage pulses having values above the value indicated at 45 in FIGURE 3a produced at temperature T2. The output of the signalling means 68 is an indication of impending overheating of the cores in the memory array. As previously noted, while this variation in voltage is relatively small, it may be sensed in an array in which the variation is not obscured by a random pattern of half-selected pulses.

The output from the voltage sensitive signalling means 68 may be employed to temporarily arrest the operation of the apparatus in order to permit the cores of the core array to radiate their excessive heat and cool down to a normal operating temperature. Thus, the core array may be operated at a higher rate of speed than would normally be considered safe and, in the event that a given word is repeatedly selected at a rate and for a time duration giving rise to excessive heating of the cores storing that word, control may be asserted by which, for example, the operation of the apparatus may be temporarily arrested or the speed of the operation of the apparatus may be temporarily reduced permitting cooling of the overheated cores before any data is lost therefrom or the memory may be so organized that a different word in memory is temporarily selected.

While the voltage sensitive signalling means 68 may be any of many types of voltage threshold sensitive devices, it may also employ, if desired, obvious arrangements of triggers and read-write timing pulses to provide signals upon overheating and/or signals upon safe operation as may be desired.

Figure 6C:
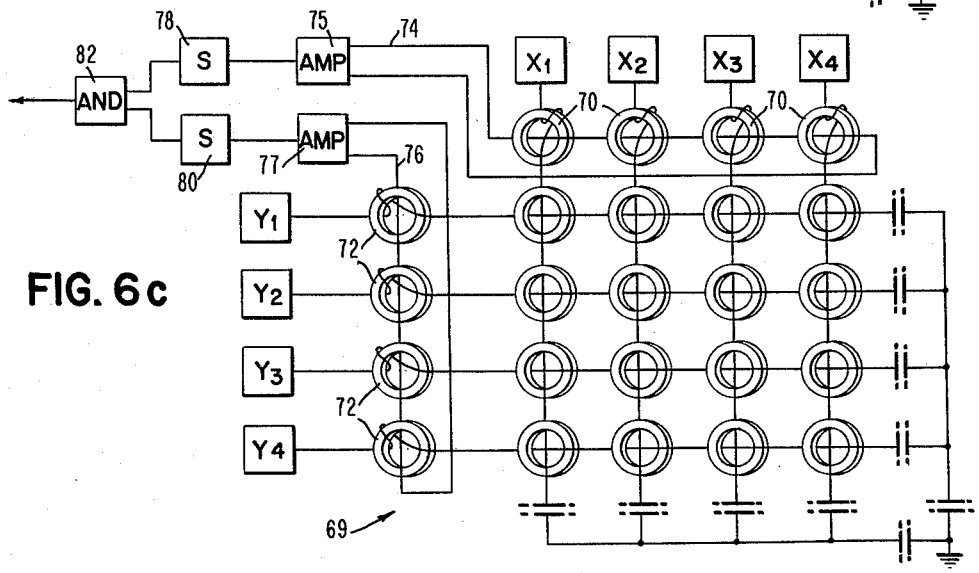

An alternative form of the invention is shown in FIGURE 6c in which a core 70 is mounted on each of the X drive lines and a core 72 is mounted on each of the Y drive lines with two turns of each drive line extending through the associated core. Thus, the half-select output of any of the drivers is sufficient to switch its associated test core. In this mode of operation, a sense line 74 extends through each of the cores 70 and a second sense line 76 extends to each of the cores at 72. These two sense line outputs are fed through amplifiers 75 and 77 respectively to voltage sensitive signalling means 78 and 80, respectively, for producing signals when the sense pulse voltages are above a predetermined value. These two outputs are delivered to a conventional AND circuit 82. If a test core on an X drive line and a test core on a Y drive line are both being overheated by repeated operation, a signal will be produced at 82. Again, it is noted that upon a read operation of any of the test cores, all of the other test cores will always be in the "1" condition and thus random noise from half-select core pulses will always be uniform and equal for each operation and accordingly voltage sensitive signalling means can detect an increase of the test core output voltages as a result of increased temperature of the core.

Various expedients may be employed to increase the magnitude of the variation of the signal produced by the test cores. Thus, while for economy, it may be desirable to employ a test plane substantially identical to the information planes, in order to improve reliability it is desirable to provide test cores giving a "stronger" indication of impending overheating. This may be accomplished by employing in the test array, cores having a more rapid falling off of $H_c$ with temperature than the cores in the memory array. For example, if the cores in the memory array have an $H_c$ curve such as that indicated at 40 in FIGURE 3a, and the cores in the test array have an $H_c$ curve such as that indicated at 44 in FIGURE 3a, the cores in the test array will, at temperature T2, produce, upon switching, a $V_s$ pulse of substantially greater increase in amplitude over that produced at T1 than the increase in the $V_s$ pulse of the core of curves 40 and 42. This greater degree of voltage increase provided by the test core will obviously be more easily sensed and measured.

Another expedient that may be employed to increase the sensitivity of the test cores is to reduce the dissipation of heat therefrom. In many memory arrays, it is conventional to provide a flow of cooling air through the array, thus, if the cores are individually coated with an insulating material, such as the coating 84 on the core 86, shown in FIGURE 4a, the cores will heat more rapidly. Alternatively, the entire test core array, which is conventionally suspended within a frame shown at 88 in FIGURE 4b, may be enclosed between heat insulating plates 90. Another arrangement for reducing heat dissipation, as shown in FIGURE 4c, is to encase the cores in a core plane 89 in a heat insulating body 91. Means such as these will cause the test cores to heat more rapidly than the information bearing cores and thus, for example, while the information bearing cores have reached a temperature of T2, shown on curve 38 in FIGURE 3a, the test cores of the same material may have reached a temperature of T3. Thus, the sense output from the test cores will have increased to provide a readily detectable signal while the temperature of the information bearing cores is still at a relatively safe level.

Another expedient is to employ cores in the test array having greater cylindrical longitudinal length than the cores in the memory array. In FIGURE 5a, there is an enlarged showing of a core 92 of conventional dimensions. This core is positioned on a conductor 93 on which there is also positioned a core 94 which is substantially longer than the core 92. Upon repeated and rapid pulsing of these two cores by a drive current carried by conductor 93, the core 96 will develop a temperature gradient which is indicated at 96 in FIGURE 5b, whereas the core 94, having a greater volume to surface area ratio, will develop a temperature gradient as indicated at 98 in FIGURE 5b. These dissimilar temperature levels and distributions will produce dissimilar flux conditions in accordance with the Curie curve of the material employed in the two cores. Thus, when the two cores are switched at the same rate and the same driving currents, the output of the longer core 94 will experience a greater temperature increase and an earlier voltage increase than will the output of the shorter core 92.

Another expedient which may be employed to increase the heating of the cores in the test plane when coincident current operation is employed is to wind each of the cores with two turns of the X drive lines and two turns of the Y drive lines and to employ the Z or inhibit line to carry a negative half-select current. In this arrangement, the non-selected cores would carry a full-select drive current from either the X or their Y drive line which would be half cancelled by the half-select current carried by the inhibit line. However, the selected core would carry a total of four drive units from the total of the X and Y drivers, one unit of which would be cancelled by the inhibit line. Thus, the selected core would be driven with a net balance of three drive units as indicated by the line 15 in FIGURE 1a which would drive the core to a magnetic state indicated by the point 17. The additional saturation resulting from the difference between driving to the point 13 and the point 17 on the curve of FIGURE 1a would add to the heating of the core. This expedient may be employed to add to the heating of cores in the test plane which would be of the same material and construction as the cores in the information bearing planes. Thus, the only change in this embodiment of the invention is a change in wiring of the test plane.

Still another modification which may be employed to increase the degree of heating of the test core and to increase the voltage of the sense output signal in the test plane is to employ cores in the test plane having a value $H_c$ twice that of the cores in the memory planes and to wind each of these cores with two turns of the X and Y drive lines. If the $H_c$ of the test cores is twice that of the memory cores than twice the drive force will be required to switch the test cores. Accordingly, the test cores will operate in the same manner as the memory cores but due to the greater amount of energy involved, will heat more rapidly, thus providing a more rapid increase of the output pulse than would be experienced by the lower $H_c$ memory cores for the same frequency of operation.

Figure 7A:
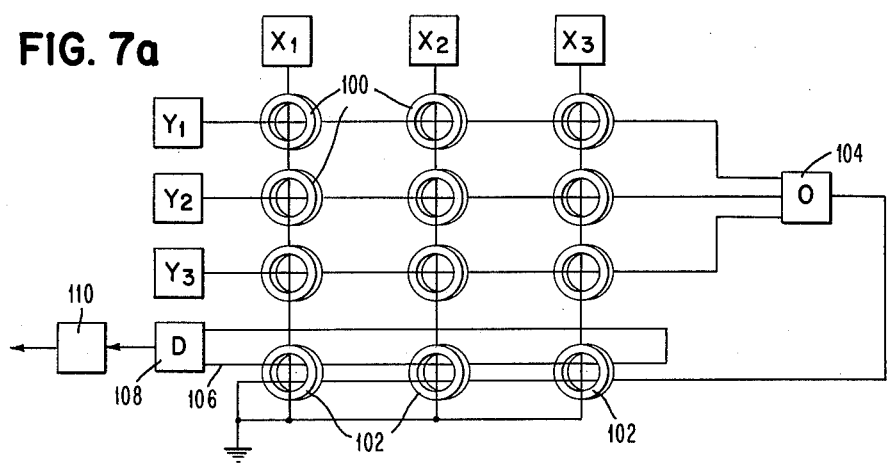
FIGURE 7a is a wiring diagram of a two dimensional core array in association with test cores.

As previously noted, the invention may also be employed in connection with two dimensional memory arrays. One such array is shown in FIGURE 7a in which cores 100 forming a two dimensional array are arranged in columns driven by X drivers and rows driven by Y drivers. In this arrangement, the X drivers provide address drivers and the Y drivers provide bit drivers, thus each column of cores forms a word in which the cores are selectively switched depending upon whether or not the Y drivers are energized. In this array, in writing, both the X and Y drivers provide half-select currents if a core is to be set to a "1" state. If the core is not to be set, the Y driver provides no output. Upon reset or read, the X driver produces a full select current to drive the cores to their "0" state.

For convenience in drawing, the array shown in FIGURE 7a employs nine cores, it will be evident, however, that in actual arrays, a great many more cores are usually employed. In the drawing, in conjunction with this array of nine cores, are shown three test cores indicated generally at 102, one threaded on each of the address or X drive lines. These cores are also driven by the output of an OR circuit 104 which is energized upon receipt of drive current from any of the drivers Y1–Y3. This output is equal to a half-select current and will switch the test core in the addressed column. The sense lines commonly employed with arrays of this type are omitted in order to simplify the drawing.

The test cores 102 are threaded by a common sense line 106 which is connected to an amplifier 108, the output of which is delivered to a voltage sensitive signal means 110 serving to produce a signal pulse when the output of these test cores rises above a predetermined voltage level.

Again it is noted that for each read operation all of the test cores will be in a "1" state and only the core in the column being switched will be changed from a "1" state to a "0" state. Thus, there are no indeterminate random noises and the signal voltage sensing means may be arranged to sense a very slight voltage change in test core output.

It will be evident that this slight voltage channel may be increased by any of the expedients herebefore noted, i.e., the cores may be insulated or of lower Curie temperature or of longitudinally longer dimension in order to render them more heat sensitive, or the cores may be driven with greater driving currents in order that more heat is dissipated in the cores and this may be accomplished by additional turns, the use of a bias and different coercivities of the cores if desired.

Figure 7B:
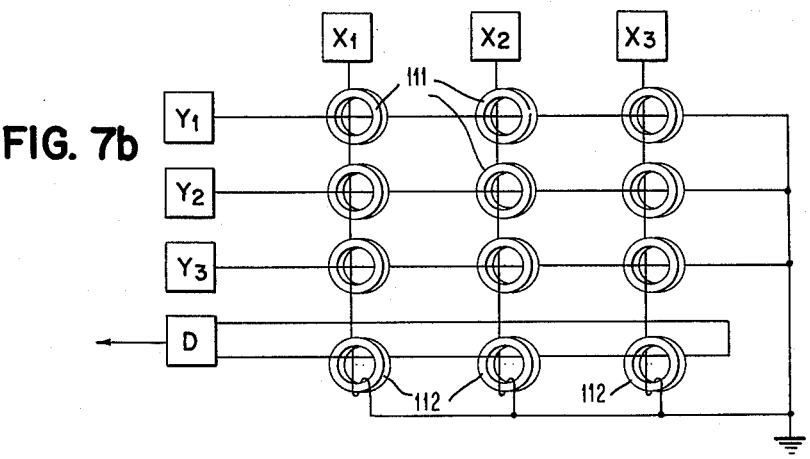
FIGURE 7b is a wiring diagram of an alternative arrangement of a two dimensional core array in association with test cores.

In FIGURE 7b, is shown another embodiment of a two dimensional array employing the invention in which an array of cores 111 are driven by X drivers defining addressing columns and Y drivers forming bit control, and employing test cores 112 on each of the X drive lines threaded by two turns of X drive lines. Thus on the write operation, the test cores will be set to the "1" state by the half-select currents of the X lines, and on the read operation, the full select currents of the address lines will serve to set the selected core to the "0" state. In this arrangement, the test cores are worked somewhat harder than the memory cores and thus will have a temperature slightly in excess of the temperature of the memory core and accordingly will lead the output voltage increase condition of the memory core if the cores are of the same materials.

Figure 8:
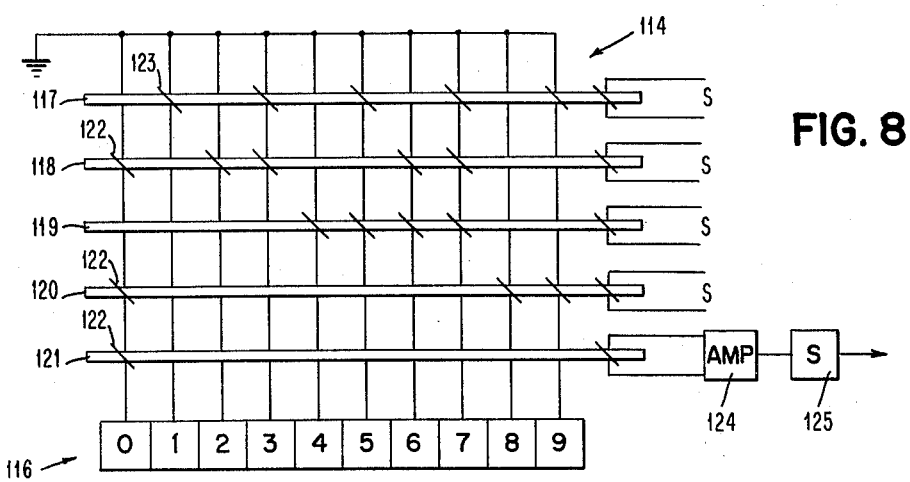
FIGURE 8 is a wiring diagram of a core translator in association with a test core.

A third broad embodiment of the invention may be found in translators. In FIGURE 8, there is indicated generally at 114 a translator employing input drivers indicated generally at 116 of decimal code. The array employs four cores, 117–120, providing for a conversion of the decimal input to a binary coded decimal output. A test core 121 is also employed. In the drawing of FIGURE 8, bars 122 are employed to indicate that the output of the "0" drive line pass through cores 118, 120, 121, with one turn. The drawing indicates that the "0" drive lines do not pass through cores 117 or 119. Similarly, the bar 123 indicates that the "1" drive line passes through only core 117. Each of the core outputs is taken on a sense line indicated by the letter S.

In this type of array, there are two ways in which the invention may be employed, one way is to provide a separate and duplicate core array of cores which are more heat sensitive which will provide a preliminary indication of increasing temperature. This is an impractical arrangement. However, in many instances in translators, one input may be employed with a much greater frequency than other inputs. For example, assume that decimal inputs are employed in which multi-digit numbers are involved frequently having mostly zeros in the higher orders of the numbers. In such an arrangement, the zero input would be the most frequently employed input. Under such a condition, a test core such as core 121 in FIGURE 8, may be employed in connection with the most frequently employed or zero input. Core 121 will then serve as the test core and its output may be delivered through an amplifier 124 to voltage sensitive signalling means 125 serving to provide the overtemperature warning. Again, if desired, a special test core may be employed, additional turns may be employed, or core coatings may be employed in order to provide a wider variation in the test core output signal.

Still another embodiment of the invention is shown in FIGURE 9a which is a showing of a test core suitable for employment with a two dimensional core system such as that shown in FIGURES 7a and 7b. One of the X drivers of such a system is indicated at 130 in FIGURE 1 having a sense line 131 extending therefrom and passing through a pair of test cores 132 and 134. The drive line 130 passes through the two test cores in the same polarity sense. Also passing through the two test cores is a sense line 136 connected to a sense amplifier 138, the output of which is delivered to signalling means 140. The sense line 136 passes through the two cores in opposite polarity sense. Thus, the $V_s$ outputs of the two cores are in opposing relation in the sense line 136 and if the $V_s$ outputs of the two cores are equal, there will be a zero resultant output voltage in the sense line 136.

The test core 134 is enclosed within a container indicated at 141 which may be employed to control the temperature of the core 134 in one of several ways which will hereinafter be discussed in connection with FIGURES 9b, 9c, and 9d.

In FIGURE 9b, there are shown on three lines $V_s$ outputs pulses. On line $V_{s132}$ are represented output pulses of core 132, on line $V_{s134}$ are represented output pulses of core 134 and on line $V_{s136}$ are represented the resultant output pulses occurring on line 136.

At a normal operating temperature, core 132 shown in FIGURE 9a produces an output pulse as indicated at 144 in FIGURE 9b. Similarly, the core 134, when it is at the same temperature as core 132 will produce a similar output pulse but of opposite polarity on the conductor 136 as indicated at 146. If the enclosure 141 serves as a thermal insulating means restricting dissipation of heat from core 134, this core will heat more rapidly than core 132. Thus upon continued operation of the core array, the output of the core 132 will experience a relatively small rise in amplitude as indicated by the dotted pulse 145 whereas the output of the heat insulated core 134 will experience a relatively greater rise as indicated at 147. When the two cores were substantially the same temperatures, their output pulses 144 and 146 were of substantially equal amplitude and cancelled each other in line 136 and thus no resultant output occurred as is indicated at 148. However, upon repeated operation when the core 134 had heated to a higher temperature than core 132, the dissimilarity in amplitude of a respective core output pulse produced a resultant pulse on line 136 as is indicated at 152. In this embodiment of the invention, the signalling means 140 is selected to produce an output signal when the input voltage thereto exceeds a predetermined amplitude.

Alternatively, the enclosure 141 may be associated with cooling means serving to maintain the core 134 at a constant temperature which may, for example, be equal to a normal minimum operating temperature for the core 132. Under such conditions, the core output pulses will appear as indicated in FIGURE 9c in which pulse 154 indicates the output of core 132 and pulse 156 indicates the output of core 134 when they are both at the same temperature, however, repeated operation of the cores will cause heating of core 132 in which case the output pulse of this core will rise as indicated at 155. When the two cores are producing substantially identical outputs, there will be a zero resultant output on line 136 as indicated at 158 in FIGURE 9c, however, when the output pulse from core 132 increases, there will result an output pulse on line 136 as indicated at 159. This pulse is delivered to the signalling means 140, which in this instance may again be arranged to respond to an output pulse exceeding a predetermined amplitude and to provide a signal in response thereto.

Still another modification of the arrangement shown in FIGURE 9a, employs heating means in connection with the enclosure 141 for maintaining the core 134 at a constant elevated temperature slightly below the upper limit of the normal operating temperature of core 132. Under these conditions, when the core 132 is at a normal lower level of operating temperature, the output of core 132 will be as is indicated at 160 in FIGURE 9d and the output of core 134 will be as indicated at 161. These two outputs will produce a resulting output on line 136 as is indicated at 163. When, however, the core 132 increases in temperature to the upper limit of normal operating temperature, the output pulse from this core will increase as is indicated at 162. As this temperature exceeds the temperature of core 134, and the amplitude of the output pulse from core 132 exceeds the amplitude of the output pulse from core 134, therefore, the polarity of the resultant output pulse will change from a negative going pulse, as indicated at 163 to a positive going pulse as is indicated at 164. Accordingly, in this arrangement, the signal means 140 is arranged to be responsive to a potential change. It will be evident that this type of response is highly reliable and is thus preferred over mere voltage level signalling devices.

From the foregoing, it will be evident that the invention has many embodiments and that the essential aspect of the invention is the provision, in a core array comprising a plurality of groups of cores, of test cores with at least one test core associated with each of the groups of cores for signalling the approach of overheating of the cores in its associated group, and that this signal may be provided by means detecting a voltage change in the output of the test core when the test core as well as the other cores in the array have begun to heat. This voltage change in the output of the test core, while small, may be detected due to the absence of random half-select noises which are present in the other cores of the array when two and three dimensional arrays are employed. Additionally, the invention contemplates the possibility of employing as test cores, cores which are more heat sensitive to thermal changes than the cores in their associated groups thus providing a higher degree of voltage change in the test core output which may be more readily measured than the change in output of the memory cores in the array. A further expedient is to drive the test cores with greater forces, thus providing for greater heating in the test cores than occurs in the other cores in the array. Another expedient is to employ test cores in combination to increase the detectability of the changes in core output voltage pulses with temperature.

As mentioned earlier herein, overheating of a core normally results in an appreciable decrease in coercivity before any substantial reduction occurs in maximum flux density, and the approach of overheating is indicated by an increase in output voltage when the core is switched. Continued overheating, however, produces serious degradation of saturation flux density, and eventually causes a decrease in the output of the core. If desired, this eventual decrease in output may be employed as the overheating signal in accordance with the foregoing teachings by making appropriate changes in the voltage sensing circuitry associated with the test cores.

From the foregoing, it will further be evident that a great variety of embodiments may be devised employing the invention set forth herein.

While the invention has been particularly shown and described with reference to preferred embodiments thereof, it will be understood by those skilled in the art that various changes in form and details may be made therein without departing from the spirit and scope of the invention.

What is claimed is:

1. In a core array including a plurality of magnetic cores and means for selectively applying magnetic excitations to said cores, the improvement comprising at least one test core associated with a group of said cores which includes at least one but less than all of the cores in said array, said test core having the characteristic that the output produced upon excitation thereof varies as the core approaches a predetermined temperature, means for magnetically exciting said test core each time a core of the said associated group in the array is excited, winding means coupled to the test core wherein voltages are induced when the test core is excited, and means responsive to predetermined variations in voltages in said winding means for producing a signal indicating that the test core is approaching said predetermined temperature.

2. The invention defined in claim 1 including means restricting dissipation of heat from said test core.

3. The invention defined in claim 1 in which said test core has a lower Curie temperature than the cores of its associated group.

4. The invention defined in claim 1 in which said test core has a higher ratio of volume to surface area than has the cores of its associated group.

5. The invention defined in claim 1 in which said test core is driven with greater driving current than cores of its associated group.

6. The invention defined in claim 1 in which said test core has a higher $H_c$ and is driven with a greater driving current than cores of its associated group.

7. In a core array including a plurality of groups of magnetic cores and means for selectively applying magnetic excitations to said cores, the improvement comprising a plurality of test cores, at least one test core associated with each of said groups of cores in said array, each test core having the characteristic that the output produced upon excitation thereof varies as the core approaches a predetermined temperature, means for magnetically exciting a test core each time its associated group of cores is excited, winding means coupled to the test cores wherein voltages are induced when the test cores are excited, and means responsive to predetermined variations in voltages in said winding means for producing a signal indicating that at least one core in a group of cores associated with a test core is approaching an overheated condition.

8. In a magnetic core array which includes a plurality of cores arranged in rows and columns, and a plurality of row and column coils, each row coil and each column coil being coupled to the cores of a different row or column, said coils being selectively energizable to magnetically excite selected cores in said array, the improvement in means for detecting the approach of overheating in the array comprising a plurality of test cores arranged in rows and columns, each said test core having the characteristic that the output produced upon excitation thereof varies as the core approaches a predetermined temperature, the test cores in each different row being coupled to a different one of said row coils and the test cores in each different column being coupled to a different one of said column coils whereby to be excited upon energization of the associated row and column coils, a common sense winding coupling all of said test cores wherein voltages are induced upon excitation of the test cores, and means coupled to said sense winding responsive to predetermined variations in said voltages for indicating the approach of overheating in the array.

References Cited in the file of this patent

UNITED STATES PATENTS 2,734,185    Warren _____ Feb. 7, 1956